C. W. SHARTLE.
PROCESS OF MANUFACTURING PAPER PULP.
APPLICATION FILED APR. 23, 1919.
1,405,945.
Patented Feb. 7, 1922.
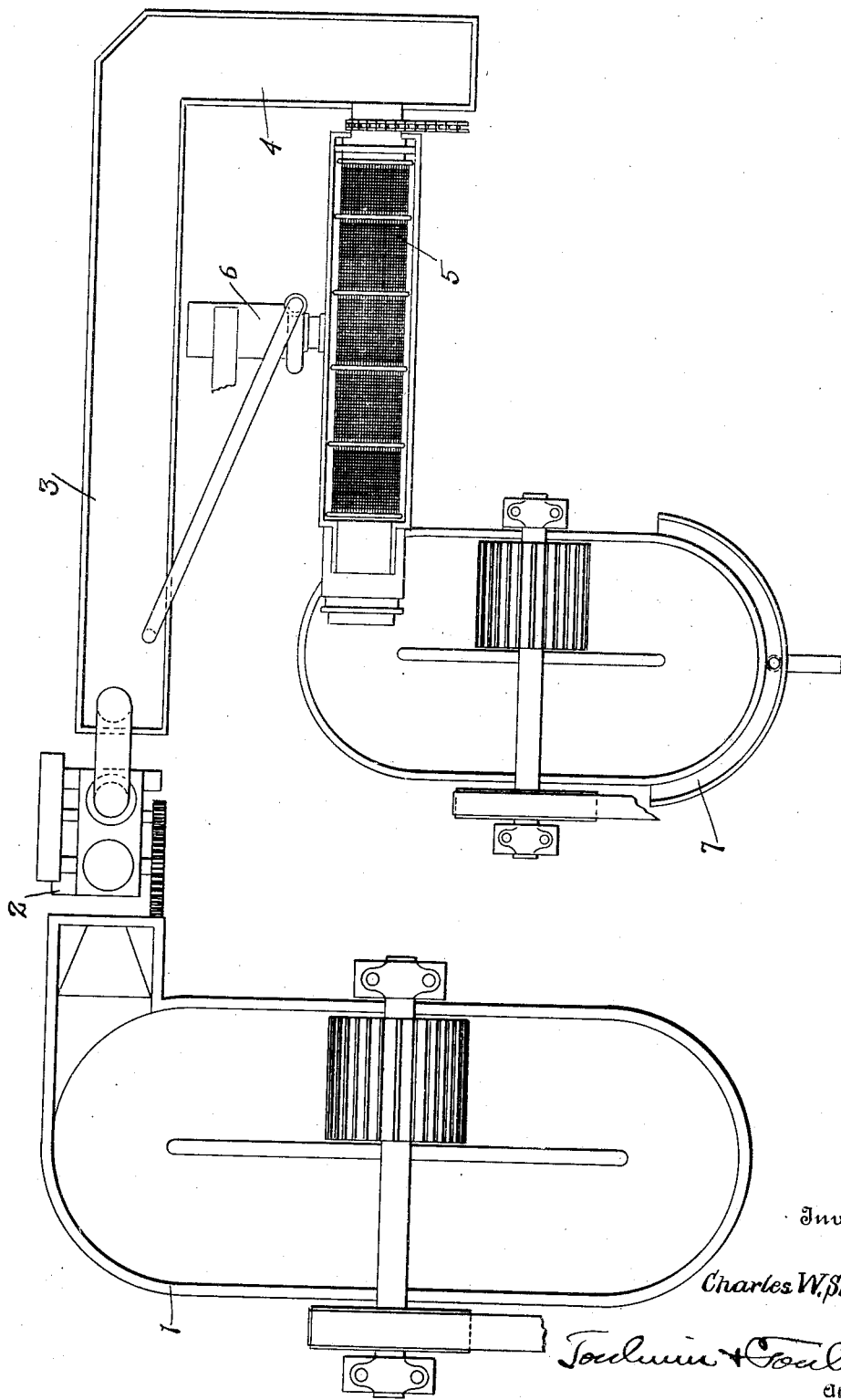
Inventor
Charles W. Shartle,
Toulmin & Toulmin,
Attorneys

UNITED STATES PATENT OFFICE.

CHARLES W. SHARTLE, OF MIDDLETOWN, OHIO, ASSIGNOR TO THE SHARTLE CONTINUOUS BEATER COMPANY, OF MIDDLETOWN, OHIO, A CORPORATION OF OHIO.

PROCESS OF MANUFACTURING PAPER PULP.

1,405,945.  Specification of Letters Patent.  Patented Feb. 7, 1922.

Application filed April 23, 1919. Serial No. 292,155.

*To all whom it may concern:*

Be it known that I, CHARLES W. SHARTLE, a citizen of the United States, residing at Middletown, in the county of Butler and State of Ohio, have invented certain new and useful Improvements in Processes of Manufacturing Paper Pulp, of which the following is a specification, reference being had therein to the accompanying drawing.

This invention relates to a process of manufacturing paper pulp.

The primary object of my invention is to provide a continuous process for reducing the paper raw stock to pulp of uniform consistency.

Difficulty in obtaining uniform reduction of the raw stock is a common experience in paper manufacturing due to the widely varying character of the raw material. By the ordinary methods of reduction uniformity of the pulp cannot be maintained without materially retarding the operations of production. With the general run of raw stock this becomes impracticable as it enters vitally into the cost of production. Therefore the common practice is, where old methods are followed, to maintain an average consistency in reduction of the material, with the result that the finished product, the various kinds and grades of commercial paper, does not run uniform in quality and grade.

The general run of raw stock consists of a promiscuous assortment of materials including all kinds of discarded paper materials, rags and fabrics ranging from the finest of silks and gauzes to the very coarsest burlaps, carpets, canvas, etc., and usually including more or less foreign substances which cannot be used in the manufacture of paper.

To the end of overcoming the problems common to reducing the raw material, to facilitate production, and to improve the quality of the finished product, I have evolved an improved process of treating paper stock consisting of continuous reducing operations by which the raw material is first reduced to an initial consistency and then subjected to a settling operation and then to a continuous reducing operation, the stock being reduced to uniform consistency and delivered continuously from the reducing operation ready for the paper forming press.

In the accompanying drawing I have shown diagrammatically a reduction apparatus in one form in which my invention may be applied.

As here shown the raw material is fed into a beater 1, which may be of any of the well known types. In this machine the material is ground to a coarse consistency and is then caused to flow by gravity or, as here shown, may be delivered by a pump 2 into a settling trough 3. As the mass of material flows through the settling trough heavy foreign substances become separated therefrom by gravitating to the bottom of the trough; light substances gradually rise to the surface and may be skimmed off as the material approaches the discharge end 4 of the trough.

The material flows from the settling trough into a worm slusher 5 which acts to separate the water from the material, the water being returned to the settling trough by a pump 6.

From the slushing device the material is delivered into a second or finishing beater 7 where the reducing operation is continuous; the portions of the material reaching the state of final reduction, being lighter than the coarser portions, overflow the top of the beater tub and pass into a storage chest ready to be introduced into the press for the paper forming operation.

While the arrangement here shown has been found to be one effective apparatus for a practical realization of my process it will be understood that the same may be practiced by other types of apparatus.

As far as I am aware I am the first to evolve and employ the continuous reducing process herein described and I wish therefore to broadly claim the same.

Having thus fully described my invention, what I claim as new and desire to secure by Letters Patent, is:

1. In the manufacture of paper pulp, the herein described process consisting in reducing the raw material to initial consistency, in subjecting the material so reduced to a settling operation whereby foreign substances are separated therefrom, in subjecting the material to a slushing operation whereby water will be extracted therefrom, in then subjecting it to a second reducing operation by which the material will be reduced to final consistency; and in floating the material which has reached final consistency to cause a continuous overflowing thereof to form a supply of finished pulp.

2. In the manufacture of paper pulp, the herein described process consisting in reducing the raw material to initial consistency, in delivering the material so reduced by gravity flow into a receptacle, wherein foreign substances are separated therefrom by gravitation, thence causing the material to pass through a slushing operation, whereby water will be extracted therefrom; in subjecting the material to a second reducing operation, whereby the material will be reduced to final consistency; portions of the material which has reached final consistency continuously overflowing the mass into a receptacle for the finished product.

3. In the manufacture of paper pulp, the herein described process consisting in reducing the raw material to initial consistency, in subjecting the material so reduced to a settling operation whereby foreign substances will be separated therefrom, thence causing the material to pass through a slushing operation, whereby water will be extracted therefrom; in subjecting the material to a second reducing operation whereby the material will be reduced to final consistency; portions of the material reaching final reduction overflowing the mass continuously into a receptacle for the finished product.

4. In the manufacture of paper pulp, the herein described process consisting in reducing the raw material to initial consistency, in subjecting the material so reduced to a settling operation, thence causing the material to pass through a slushing operation, whereby water will be extracted therefrom; in subjecting the material to a second reducing operation, whereby the material will be reduced to final consistency; portions of the material which has reached final consistency overflowing the mass continuously into a receptacle for the finished product.

5. In the manufacture of paper pulp the herein described process consisting in reducing the raw material to initial consistency, in delivering the material so reduced to a settling operation, whereby foreign substances will be separated therefrom, thence causing the material to pass through a slushing operation, whereby water will be extracted therefrom; in returning the water to the material in the settling operation and in subjecting the material to a second reducing operation, whereby it will be reduced to final consistency; portions of the material reaching final reduction continuously overflowing the mass into a receptacle for the finished product.

6. In the manufacture of paper pulp the herein described process consisting in reducing the raw material to initial consistency, in delivering the material so reduced to a settling operation, whereby foreign substances will be separated therefrom, thence causing the material to pass through a slushing operation, whereby water will be extracted therefrom; in subjecting the material to a second reducing operation whereby it will be gradually reduced to required consistency; portions of the material reaching final state of reduction rising to the top and overflowing the mass into a receptacle for the finished product.

7. In the manufacture of paper pulp the herein described process consisting in reducing the raw material to initial consistency, in delivering the mass of material so reduced through a settling and slushing process whereby foreign substances and water will be eliminated therefrom, in continuously subjecting the material to an operation whereby final reduction thereof is gradually accomplished, finished portions of the material rising to the top of the mass and overflowing therefrom into a receptacle for the finished product.

In testimony whereof, I affix my signature.

CHARLES W. SHARTLE.